Oct. 24, 1967        G. L. WILDE ET AL        3,348,379
TURBOJET ENGINE WITH COMPRESSOR BYPASS AND AFT FAN
Filed Sept. 18, 1964
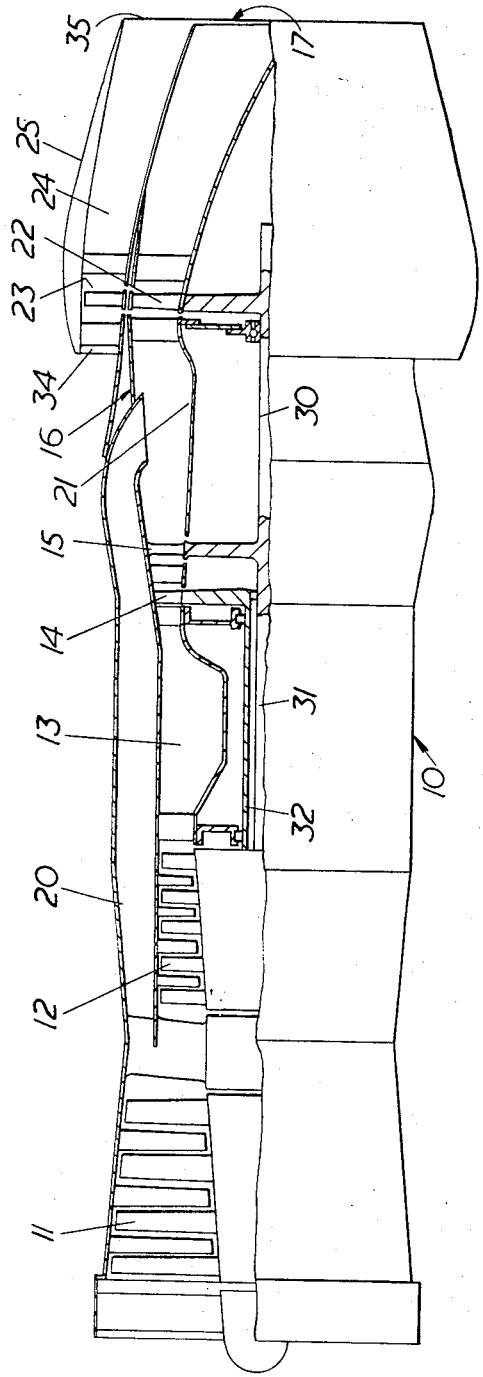

United States Patent Office 3,348,379
Patented Oct. 24, 1967

3,348,379
TURBOJET ENGINE WITH COMPRESSOR BYPASS AND AFT FAN
Geoffrey Light Wilde, Turnditch, Cowers Lane, Derby, and John Frederick Coplin, Littleover, Derby, England, assignors to Rolls-Royce Limited, Derby, England, a British company
Filed Sept. 18, 1964, Ser. No. 397,518
Claims priority, application Great Britain,
Sept. 25, 1963, 37,826/63
7 Claims. (Cl. 60—226)

This invention concerns gas turbine jet propulsion by-pass engines.

According to the present invention there is provided a gas turbine jet propulsion by-pass engine comprising compressor means, combustion equipment, turbine means and an exhaust duct mounted in flow series, a by-pass duct through which air may flow from the compressor means to the exhaust duct thus by-passing the combustion equipment and said turbine means, the by-pass air mixing with the turbine exhaust gases in a mixing zone within said exhaust duct, an auxiliary turbine mounted within the exhaust duct downstream of the mixing zone and a fan drivingly connected to said auxiliary turbine.

The fan may be rotatably mounted within an annular duct surrounding the exhaust duct.

Preferably the blades of said fan are mounted on the tips of the blades of said auxiliary turbine such as to be driven directly thereby.

The auxiliary turbine may be drivingly connected to said turbine means.

In a preferred embodiment, the compressor means comprises a high pressure and a low pressure compressor, and said turbine means comprises a high pressure and a low pressure turbine, the high pressure compressor and turbine being mounted on one common shaft and said low pressure compressor and low pressure turbine being mounted on a second common shaft, the auxiliary turbine being mounted on a third shaft. The third shaft may be drivingly connected to said second common shaft.

The invention also includes an aircraft provided with a gas turbine engine as set forth above.

The invention is illustrated, merely by way of example, in the accompanying drawing which shows a gas turbine jet propulsion by-pass engine in accordance with the present invention.

Referring to the drawing, a gas turbine jet propulsion by-pass engine 10 comprises a low pressure compressor 11, a high pressure compressor 12, combustion equipment 13, a high pressure turbine 14, a low pressure turbine 15 and an exhaust duct 16. The gases from the engine exhaust to atmosphere through an exhaust nozzle 17.

Mounted about the high pressure compressor 12, combustion equipment 13 and turbines 14, 15, is a by-pass duct 20. Air leaving the low pressure compressor 11 is divided, some flowing through the high pressure compressor 12, combustion equipment 13 and turbines 14, 15, and the remainder flowing through the by-pass duct 20.

The by-pass duct 20 directs the air flowing therethrough to the exhaust duct 16 downstream of the turbines 14 and 15. The air leaving the by-pass duct 20 mixes with the exhaust gases leaving the turbines 14, 15, in a mixing zone 21 within the exhaust duct 16.

Disposed within the exhaust duct 16, downstream of the mixing zone 21 is an auxiliary turbine 22. Mounted on the tips of the blades of the auxiliary turbine 22 are the blades of a fan 23. The fan 23 is disposed within an annular duct 24 surrounding the exhaust duct 16. A fairing 25 and the exhaust duct 16 define the annular duct 24 therebetween.

The turbine 22 is mounted on a shaft 30 which, although shown as a part of a common shaft 31 in the embodiment illustrated, may be rotatable independently of the common shaft 31 upon which are mounted the low pressure compressor 11 and the low pressure turbine 15. The high pressure compressor 12 and high pressure turbine 14 are mounted on a common shaft 32.

In operation, the exhaust gases mixed with the by-pass air within the mixing zone 21 pass through the turbine 22 and then to atmosphere via exhaust nozzle 17. The turbine 22 drives the fan 23 which draws air in through an inlet 34 to the annular duct 24 and discharges it through a downstream end 35 of the annular duct. The air forced through annular duct 24 by the fan 23 provides thrust which augments the thrust obtained from the gases exhausting to atmosphere through exhaust nozzle 17.

The axial distance between the low pressure turbine 15 and the auxiliary turbine 22 can be reduced considerably from the amount shown in the drawing, provided the total pressure in the by-pass air and in the gases leaving the low pressure turbine 15 are substantially the same. Thus the distance between the low pressure turbine 15 and turbine 22 is occupied by the mixing zone 21, the length of which is dictated by the efficiency with which the by-pass air and exhaust gases mix together. This length can be reduced if their total pressures are substantially identical. Thus the auxiliary turbine 22 may be moved to a position just downstream of low pressure turbine 15, with a consequent shortening in the overall length of the engine, and a saving in weight since less material will be required in the construction.

We claim:

1. A gas turbine jet propulsion by-pass engine comprising compressor means, combustion equipment, turbine means and an exhaust duct mounted in flow series, a by-pass duct through which air may flow from the compressor means to the exhaust duct thus by-passing the combustion equipment and said turbine means, a mixing zone within said exhaust duct, the by-pass air mixing with the turbine exhaust gases in said mixing zone, an auxiliary turbine mounted within the exhaust duct downstream of the mixing zone and a fan drivingly connected to said auxiliary turbine.

2. A gas turbine jet propulsion by-pass engine comprising compressor means, combustion equipment, turbine means and an exhaust duct mounted in flow series, a by-pass duct through which air may flow from the compressor means to the exhaust duct thus by-passing the combustion equipment and said turbine means, a mixing zone within said exhaust duct, the by-pass air mixing with the turbine exhaust gases in said mixing zone, an auxiliary turbine mounted within the exhaust duct downstream of the mixing zone, an annular duct surrounding the exhaust duct, and a fan mounted within the annular duct and drivingly connected to said auxiliary turbine.

3. A gas turbine jet propulsion by-pass engine comprising compressor means, combustion equipment, turbine means and an exhaust duct mounted in flow series, a by-pass duct through which air may flow from the compressor means to the exhaust duct thus by-passing the combustion equipment and said turbine means, a mixing zone within said exhaust duct, the by-pass air mixing with the turbine exhaust gases in said mixing zone, an auxiliary turbine mounted within the exhaust duct downstream of the mixing zone and a fan the blades of which are mounted on the tips of the blades of said auxiliary turbine such as to be driven directly thereby.

4. A gas turbine jet propulsion by-pass engine comprising compressor means, combustion equipment, turbine means and an exhaust duct mounted in flow series, a by-pass duct through which air may flow from the compressor means to the exhaust duct thus by-passing the combustion equipment and said turbine means, a mixing zone within said exhaust duct, the by-pass air mixing with the turbine exhaust gases in said mixing zone, an auxiliary turbine mounted within the exhaust duct downstream of the mixing zone and drivingly connected to said turbine means and a fan drivingly connected to said auxiliary turbine.

5. A gas turbine jet propulsion by-pass engine comprising a low pressure and a high pressure compressor, combustion equipment, a high pressure and a low pressure turbine and an exhaust duct mounted in flow series, one common shaft on which the high pressure compressor and turbine are mounted, and a second common shaft on which said low pressure compressor and low pressure turbine are mounted, a by-pass duct through which air may flow from the low pressure compressor to the exhaust duct thus by-passing the combustion equipment and said turbines, a mixing zone in said exhaust duct, the by-pass air mixing with the turbine exhaust gases in said mixing zone, a third shaft, an auxiliary turbine mounted on said third shaft within the exhaust duct downstream of the mixing zone, and a fan drivingly connected to said auxiliary turbine.

6. A gas turbine jet propulsion by-pass engine comprising a low pressure and a high pressure compressor, combustion equipment, a high pressure and a low pressure turbine and an exhaust duct mounted in flow series, one common shaft on which the high pressure compressor and turbine are mounted, and a second common shaft on which said low pressure compressor and low pressure turbine are mounted, a by-pass duct through which air may flow from the low pressure compressor to the exhaust duct thus by-passing the combustion equipment and said turbines, a mixing zone in said exhaust duct, the by-pass air mixing with the turbine exhaust gases in said mixing zone, a third shaft drivingly connected to said second common shaft, an auxiliary turbine mounted on said third shaft within the exhaust duct downstream of the mixing zone, and a fan drivingly connected to said auxiliary turbine.

7. A gas turbine jet propulsion by-pass engine as claimed in claim 6, wherein said auxiliary turbine is spaced downstream from said low pressure turbine and said mixing zone is located in the space between said auxiliary turbine and said low pressure turbine, the pressure of the by-pass air and the exhaust gases being substantially identical so that the length of the mixing zone is reduced to a minimum.

References Cited
UNITED STATES PATENTS

| | | |
|---|---|---|
| 2,994,472 | 8/1961 | Botje. |
| 3,070,285 | 12/1962 | Oldfield _____ 60—35.6 X |
| 3,100,627 | 8/1963 | Wilde. |
| 3,107,690 | 10/1963 | Pope et al. _____ 60—35.6 X |

MARK M. NEWMAN, *Primary Examiner.*

SAMUEL LEVINE, CARLTON R. CROYLE,
*Examiners.*

D. HART, *Assistant Examiner.*